Figure 1:
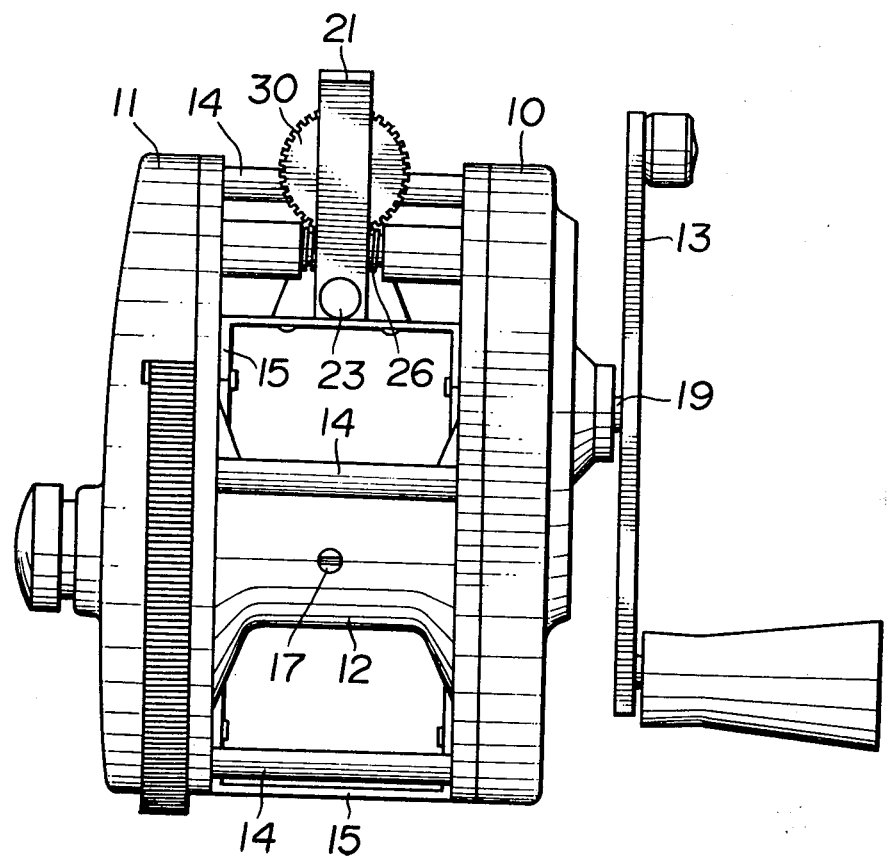

United States Patent [19]

Kamikawa

[11] 3,993,264
[45] Nov. 23, 1976

[54] FISHING REEL
[75] Inventor: Kiyohide Kamikawa, Osaka, Japan
[73] Assignee: Shimano Industrial Company, Limited, Osaka, Japan
[22] Filed: Apr. 28, 1975
[21] Appl. No.: 572,313

[30] Foreign Application Priority Data
May 10, 1974 Japan.............................. 49-53402

[52] U.S. Cl. ........................................... 242/84.41
[51] Int. Cl.² ........................................ A01K 89/04
[58] Field of Search............ 242/84.41, 84.4, 84.42, 242/84.43, 158.1, 158.2, 158.5

[56] References Cited
UNITED STATES PATENTS

| | | |
|---|---|---|
| 2,461,884 | 2/1949 | Elsinger............................ 242/84.41 |
| 3,598,334 | 8/1971 | Fleischer........................... 242/84.41 |
| 3,624,798 | 11/1971 | Fleischer........................... 242/84.41 |

Primary Examiner—Edward J. McCarthy
Attorney, Agent, or Firm—Stevens, Davis, Miller & Mosher

[57] ABSTRACT

A fishing reel which winds up a fishing line on a spool journaled between two opposite housings of the reel so as to be rotated with a crank handle. The reel also has a line guide provided forwardly of the spool in the direction of draw-out of the line, which line guide can be smoothly reciprocated through a drive transmission in cooperative rotation with a subordinate spindle and a rotary member in mesh with the drive transmission so that the crank handle may be lightly turned to wind the level on the spool without any interruption.

7 Claims, 5 Drawing Figures

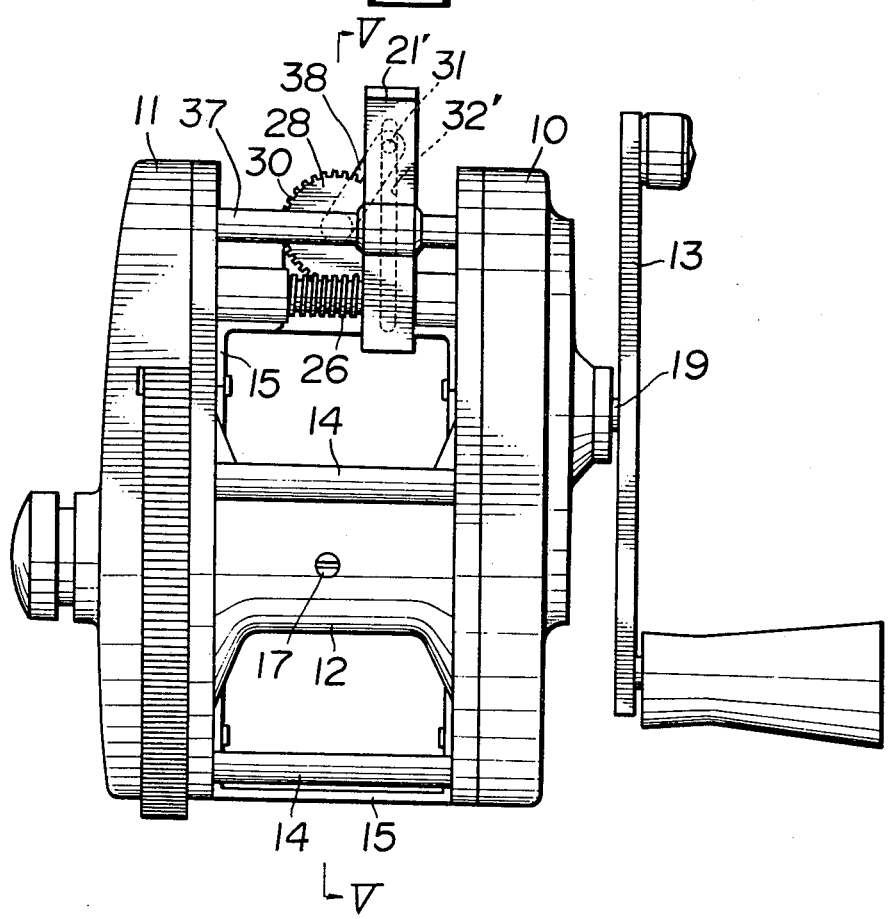

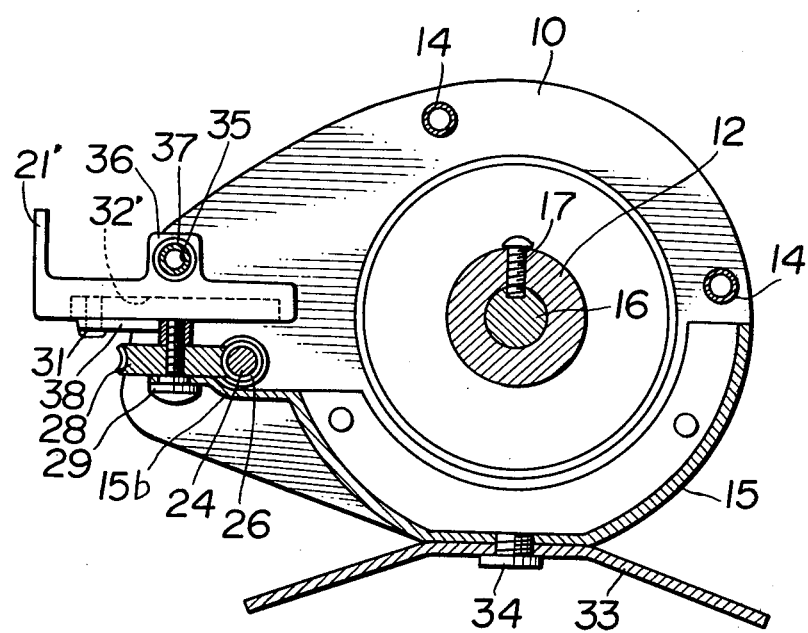

FISHING REEL

This invention relates to a fishing reel which is adapted to wind up a fishing line on a rotatable spool of the reel, and more particularly to a fishing reel which is so constructed that the spool journaled between two opposite housings of the reel is rotated to wind up the fishing line on the spool by means of a crank handle and that a line guide is provided forwardly of the spool in the direction of draw-out of the line and reciprocated axially of the spool so that the spool is permitted to wind the line thereon in a level manner.

Conventionally, this kind of fishing reel employs a rotatable subordinate spindle journaled between two opposite housings of the reel. The subordinate spindle is located forwardly axially of a spool in the direction of draw-out of a fishing line from the spool so as to be rotated in association with the spool shaft, and is provided with a line guide having a guide bore for the line and inserted onto the subordinate spindle. The line guide has a pin directed inwardly thereof and engageable with right and left intersecting threads at the outer periphery of the spindle so that the line guide may be reciprocated axially of the axis of the spool. In this instance, the pin is occasionally caught by the abovementioned threads at the crossing thereof, which causes the subordinate spindle to be rotated with difficulty as a result, a resistance is applied to the crank handle to interrupt the line winding on the spool. Furthermore, while the pin is caught by the threads, the handle is forced to be operated with great momentum; therefore, the pin or threads may be damaged.

The present invention has been designed to eliminate the defects of the conventional reel described above.

An object of the invention is to provide a fishing reel capable of smoothly and uniformally winding a fishing line on a spool of the reel.

Another object of the invention is to provide a fishing reel capable of steadily winding up a fishing line on a spool even with light turns of a crank handle.

Still another object of the invention is to provide a fishing reel without any faults.

Figure 2:
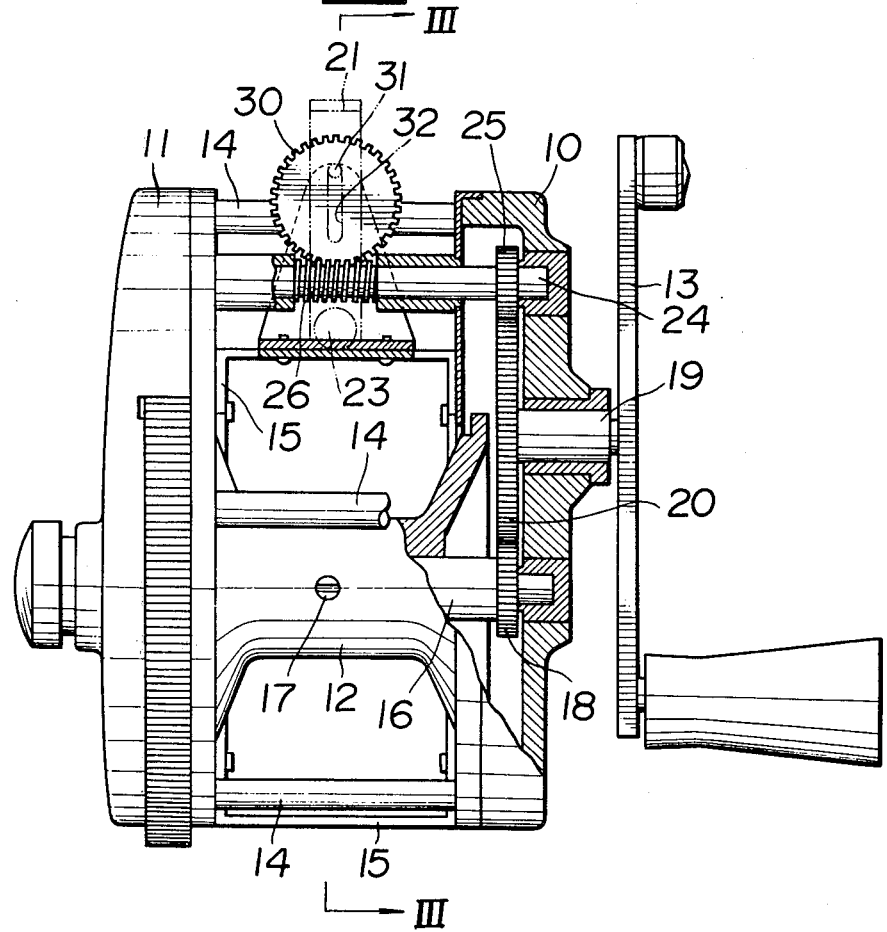
Figure 3:
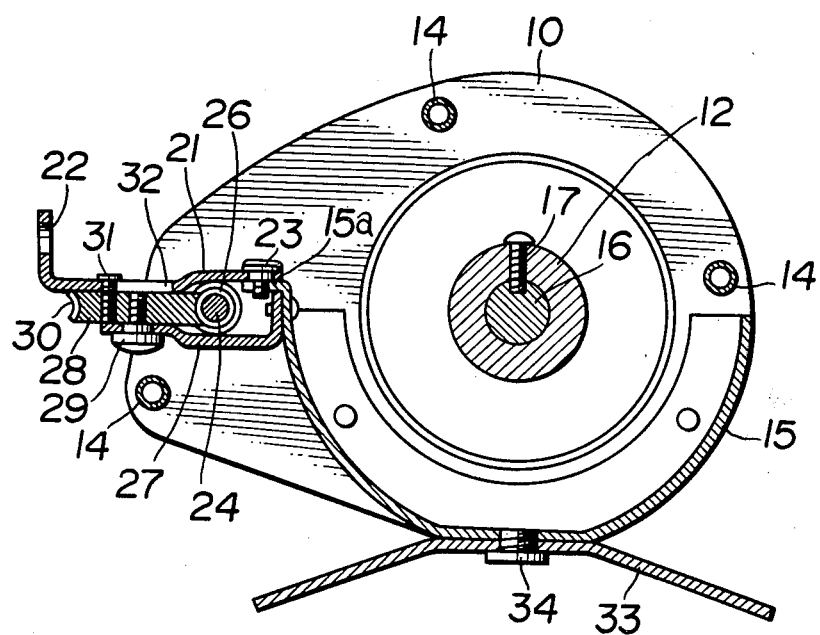

The abovementioned objects and other effects will be apparent from the following description in accordance with the accompanying drawings, in which FIG. 1 is a plan view of a fishing reel of the invention, FIG. 2 is a partially cutaway plan view thereof, FIG. 3 is a sectional view taken on line III—III in FIG. 2, FIG. 4 is a plan view of a modified embodiment of the reel of the invention, and FIG. 5 is a sectional view taken on line V—V in FIG. 4.

Referring to the drawings, reference numerals 10 and 11 denote two opposite housings of a fishing reel of the invention, which housings accommodate therebetween a spool 12 rotated with a crank handle 13.

Both the housings 10 and 11 are made of synthetic resin or other materials and formed in a substantially box-like shape respectively, being inwardly bent at the outer periphery thereof. The housings 10 and 11 are fixedly connected a a given spaced interval therebetween by means of a plurality of connecting rods 14, each of equal length, and a cover plate 15 of a semicircular shape.

The spool 12 is insertibly supported and fixed with a pin 17 to a spool shaft 16 journaled between the housings 10 and 11 so that the spool may be rotatable together with the shaft 16. The shaft 16 is provided at one end thereof with a gear 18 in mesh with a gear 20 coupled to a driving shaft 19 as described hereinafter.

The crank handle 13 is rigidly fixed to an external end of the driving shaft 19 which is rotatably supported with one of the housings 10 and 11. The gear 20 is fixed to an internal end of the driving shaft 19 so as to be in mesh with the gear 18 coupled to the spool shaft 16. Thus, the crank handle is operated to rotate the spool 12 through the gears 20 and 18 and the spool shaft 16, resulting in winding the line on the spool.

The fishing line is wound on the spool by being guided through a line guide 21 as described hereinafter, which line guide is formed of a strip of thin plate, bent upright at one end thereof, and has a bore 22 for passing the line therethrough. The line guide 21 is, as is best seen in FIG. 3, pivotally supported on the semicircular cover plate 15 through a pin 23. The cover plate 15 is radially bent at the fore end thereof so as to form a support 15a carrying thereon the other end of the line guide 21 in the relationship that the line guide 21 becomes swingingly movable around the pin 23 in the axial direction of the spool.

The swinging motion of the line guide 21 is associated with rotation of the spool in the following manner. Namely, a subordinate spindle 24 is journaled between the opposite housings 10 and 11 in advance of the spool at the line drawout side thereof. The subordinate spindle 24 is provided at one end thereof at the housing 10 side with a gear 25 in mesh with the gear 20 and at a substantially middle portion of the outer periphery of the spindle with a helical female spline 26 serving as a drive transmission. A rotary member 28 of a disc-like shape is located at a plate member 27, of a substantially triangular shape, which is, as shown in FIG. 3, attached at one bent end thereof to the outer surface at of the fore end portion of the cover plate 15 by means of a screw, the rotary member 28 being rotatably supported with respect to the plate member 27 through a screw bolt 29. The rotary member 28 is provided at the outer periphery thereof with an axially oblique male spline 30 engageable with the female spline 26 of the subordinate spindle, whereby the rotary member 28 becomes rotatable in engagement with the subordinate spindle 24 through the spline connection 24 and 30.

In addition, the rotary member 28 has a pin 31 positioned off center and protruding from the upper surface thereof, which pin 31 is inserted into a slot 32 formed lengthwise of the line guide 21. Also, the reference numeral 33 denotes a leg for mounting the reel to a fishing rod, which is fixed to the lower surface at the middle of the cover plate 15 by means of a screw 34.

Now, the function of the reel of the invention, constructed as aforesaid, will be described in detail.

When an angler tries to rotate the crank handle 13 to wind up the line, the rotation of the handle is transmitted from the driving shaft 19 to the spool shaft 16 through the gear 20 and the gear 18 in mesh with each other so that the spool may be rotated to wind up the line thereon in succession. At the same time, the rotation of the crank handle 13 is also transmitted from the driving shaft 19 to the subordinate spindle 24 through the gear 20 and the gear 25 so that the subordinate spindle 24 may be rotated, that is, the subordinate spindle 24 is associated with the spool 12 and permits the rotary member 28 to be rotatable through engagement of both the splines 26 and 30. Hence, the off centered pin 31 protruding from the surface of the rotary member 28, becomes rotatable around the screw bolt 29, whereby the pin 31 causes the line guide 21 to be swung axially of the spindle 24 around the pin 23 through the engagement of the pin 31 with the slot 32. In this instance, since the line passes through the guide bore 22, the line guide 21 guides the line so that it is wound level on the spool 12.

Besides the abovementioned construction of the reel of the invention, a modified embodiment thereof as shown in FIGS. 4 and 5, may be used as in the following description.

Referring to FIGS. 4 and 5, the reference numeral 21' denotes a line guide for a fishing line having a boss 36 with a hole 35 perforated therethrough, and the reference numeral 37 denotes a guide rod which is mounted near and in parallel to the aforesaid subordinate spindle 24 between the aforesaid opposite housings 10 and 11. The rod 37 is inserted into the through hole 35 so that the line guide 21' may be slidably supported by the rod 37; thus the line guide 21' can be axially reciprocated along the rod 37.

The aforesaid rotary member 28 is rotatably mounted on the upper surface of one end portion 15b of the aforesaid semicircular cover plate 15, through a screw bolt 29, which end portion is formed of a radially bent one end of the cover plate. An arm 38 is, as shown in FIG. 5, fixed at one end thereof to the center of the upper surface of the rotary member 28 and a pin 31 is mounted upright to the other end of the upper surface of the arm 38, which pin 31 is inserted into a slot 32' formed at the lower surface of the line guide 21', so that the arm 38 is rotated around the fixed end thereof together with the rotary member 28; thus the line guide 21' can be axially reciprocated along the rod 37 through the hole 35 due to the engagement of the pin 31 with the slot 32'.

In this construction, the line guide 21' can be axially reciprocated along the rod 37 in association with the spool rotation through the driving shaft 19, the gear 25 at the subordinate spindle, the spline connection of the spindle 25 and the rotary member 28, and the arm 38 in rotation, so that the line guide 21' may lead the fishing line to be wound up level on the spool 12.

In this instance, when the through hole 35 is circular and the rod 37 is circular in section, the line guide 21' is apt to be rotatable around the latter, hence, any means, such as an isolated rod in parallel, is required to prevent the rotation. For this purpose, it is enough to make the through hole 35 square and the rod 37 square in section.

While the form of embodiment of the invention as herein described constitutes a preferred form, it is to be understood that the invention is not limited to the specific embodiment thereof except as defined in the appended claims.

What is claimed is:

1. A fishing reel having two opposite housings, a spool axially rotatably supported between said housings and a crank handle fixed to a driving shaft supported on one of said housings so that said crank handle rotates the spool through said driving shaft for winding a fishing line thereon, comprising:
   a. a subordinate spindle which is axially rotatable supported between both said housings in advance of the spool in the direction of draw-out of the fishing line, said subordinate spindle being roatable by operation of said crank handle,
   b. a drive transmission at the middle portion of said subordinate spindle,
   c. a rotary member in mesh with said drive transmission, said rotary member being rotatable around an axis substantially perpendicular to the axis of the subordinate spindle;
   d. a movable line guide with a guide bore for guiding the fishing line therethrough, said line guide being provided at one side of said rotary member, said bore being reciprocable substantially axially of said spool, said line guide having at a middle portion thereof a slot extending in a direction perpendicular to the direction of movement of said line guide; and
   e. a first pin located off center of said rotary member, said first pin extending from one side of said rotary member towards said slot and entering into said slot at the tip of said first pin, said first pin revolving around the axis of said rotary member when said rotary member rotates so that the tip of said first pin is slidable within said slot to reciprocate said line guide.

2. The fishing reel according to claim 1, wherein said line guide is pivoted through a second pin to a fixed member which is mounted between both said housings so that the line guide may be swingingly movable around said second pin.

3. The fishing reel according to claim 2, wherein said fixed member includes means fixedly connecting both said housings to each other.

4. The fishing reel according to claim 1, wherein said line guide is slidably supported an a guide rod provided between both said housings so as to reciprocate along said rod.

5. The fishing reel according to claim 1, wherein said drive transmission comprises a helical female spline formed at the outer periphery of said middle portion of said subordinate spindle, and wherein said rotary member comprises a male spline formed axially and obliquely at the outer periphery of said rotary member, whereby the drive of said subordinate spindle may be transmitted to said rotary member through meshing of said male spline with said female spline.

6. The fishing reel according to claim 3 wherein said fixed member comprises a cover plate.

7. The fishing reel according to claim 1 wherein said rotary member includes a rotatable arm connected at one end to said one side of said rotary member, said first pin being connected to the other end of said arm.

* * * * *